Sept. 14, 1965  J. C. PEARL  3,205,985
TORQUE RESPONSIVE CLUTCH
Filed March 18, 1963  2 Sheets-Sheet 1
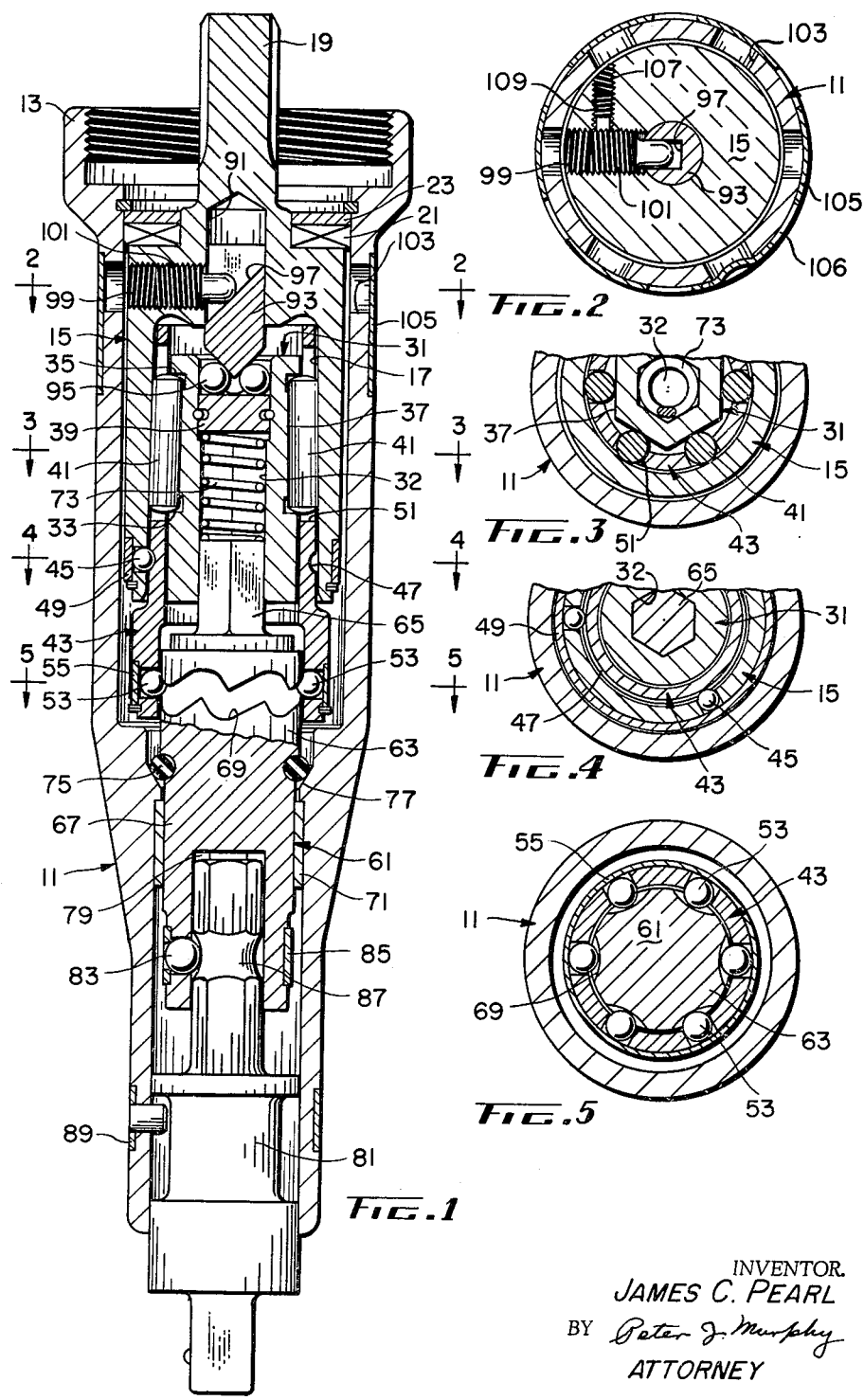
INVENTOR.
JAMES C. PEARL
BY Peter J. Murphy
ATTORNEY

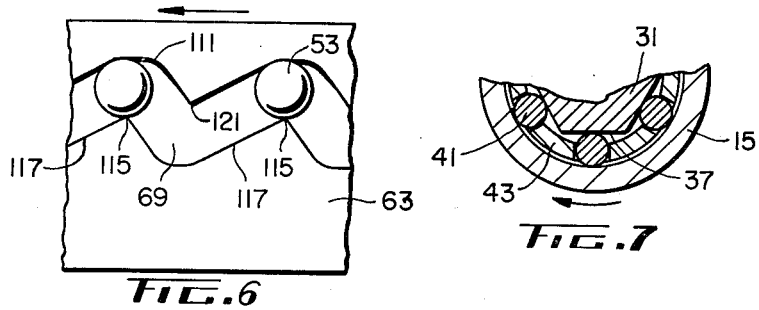
FIG. 6
FIG. 7
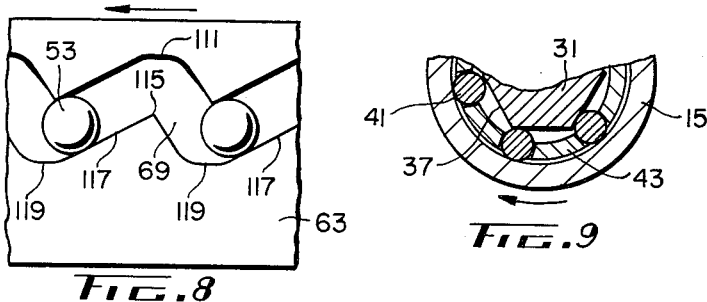
FIG. 8
FIG. 9
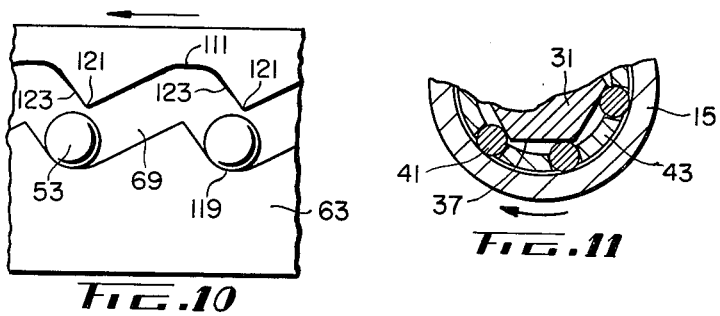
FIG. 10
FIG. 11
INVENTOR.
JAMES C. PEARL
BY Peter J. Murphy
ATTORNEY United States Patent Office 3,205,985
Patented Sept. 14, 1965

3,205,985
TORQUE RESPONSIVE CLUTCH
James C. Pearl, Grand Haven, Mich., assignor to Gardner-Denver Company, a corporation of Delaware
Filed Mar. 18, 1963, Ser. No. 265,870
11 Claims. (Cl. 192—56)

The invention relates to a torque responsive clutch and, more particularly, to a kickout clutch for use with power tools wherein the clutch is disengaged in response to a predetermined torque and remains disengaged until it is automatically reset and engaged through normal operation of the tool.

The invention is concerned with a clutch having concentric driving and driven members, wherein rollers are carried in a cage between the clutch members. The clutch surface of the driven clutch member is irregular and defines ridges which act to wedge the rollers against the opposing clutch surface of the driving clutch member to effect clutch engagement. Upon application of a predetermined torque, the rollers pass over the ridges deforming the driving member, thereby disengaging the clutch. The clutch is controlled by controlling the rotation of the roller cage relative to the driven clutch member.

Heretofore clutches of this type have relied on frictional drag between the driving and driven members to effect certain movements of the rollers relative to the driven member. Since the magnitude of the frictional drag is inconsistent and difficult to control, the operation of such clutches may be irregular. In some clutches of this type, the same frictional drag results in rotation of the driven member when a tool, including such clutch, is removed from the work and while the clutch is in disengaged condition. This results in rotation of the tool output spindle, making it difficult for the operator to apply the tool to the work.

A principal object of this invention is to provide a clutch of the above type having means for positively positioning the rollers relative to the driven clutch member to effect positive engagement and resetting of the clutch mechanism.

Another object of the invention is to provide a clutch of the above type having means acting between the cage and the driven member to positively control the several positions of the rollers relative to the driven member during a clutch cycle.

A further object of this invention is to provide a clutch of the above type wherein the output spindle is axially movable relative to the cage, and wherein such axial movements of the spindle automatically control the movements and positions of the rollers.

A still further object of this invention is to provide a clutch of the above type comprising a clutch assembly which is completely self-contained and adapted for assembly, as a unit, into a suitable housing.

A still further object of this invention is to provide a clutch of the above type having means for preventing rotation of the output spindle caused by frictional drag, when the clutch is in the disengaged condition.

A still further object of this invention is to provide a clutch of the above type having minimum number of parts resulting in simplicity of structure, and which is reliable in operation.

The novel features of the invention, as well as additional objects and advantages thereof, will be understood more fully from the following description when read in connection with the accompanying drawings, in which:

FIG. 1 is a longitudinal sectional view of a clutch assembly embodying the present invention, adapted for attachment to a power tool;

FIG. 2 is a sectional view taken along the line 2—2 of FIG. 1, looking in the direction of the appended arrows;

FIG. 3 is a sectional view taken along the line 3—3 of FIG. 1, looking in the direction of the appended arrows;

FIG. 4 is a sectional view taken along the line 4—4 of FIG. 1, looking in the direction of the appended arrows;

FIG. 5 is a sectional view taken along the line 5—5 of FIG. 1, looking in the direction of the appended arrows;

FIGS. 6, 8 and 10 are diagrammatic views comprising planar developments of the ball track or groove in which the clutch output spindle showing the relative positions of the balls and track during a clutch operating cycle; and FIGS. 7, 9 and 11 are fragmentary sectional views, as viewed in the plane of FIG. 3, for example, showing the relative positions of the driven member, cage, and rollers during a clutch operating cycle.

Referring now to the drawings, a preferred embodiment of a clutch according to the present invention is shown in FIGS. 1 through 5. This embodiment comprises a complete assembly which is adapted for attachment to a pneumatic driving motor, for example; and for this purpose the clutch is enclosed in a generally cylindrical housing 11, having an enlarged internally threaded flange 13 at its rearward end which may be readily threaded onto the housing of the driving motor (not shown). A clutch driving member 15 comprises a cylindrical member having a tapered bore 17 opening from its forward end thereby defining a cylindrical shell, the inner wall of the shell defining a clutch surface. Due to the tapered bore, the shell is thinner in section at its forward end and increases in thickness toward the rearward end of the bore. The driving member is provided with a splined shank 19, at its rearward end, adapted for driving engagement with an internally splined member of the driving motor assembly. A thrust bearing 21 is disposed within the housing flange 13, and is retained therein by a thrust plate 23 and suitable snap ring.

The clutch driven member 31 comprises a generally cylindrical member having an axial bore 32, and is received within the bore 17 of the clutch driving member. The outer surface of the driven member is provided with two axially spaced, annular grooves 33 and 35; and between these grooves a clutch surface 37 is formed to define six equally spaced ridges and interjacent flats around the periphery of the clutch member. This clutch surface 37 is tapered to correspond to the taper of the driving member bore 17; therefore parallel opposing clutch surfaces are provided on the driving and driven members.

For the purpose of explanation and illustration, the clutch surface 17 of the driven clutch member is considered to be hexagonal in cross section. It will be understood, however, that this surface may take other forms which define ridges and interjacent relatively flat areas relative to the cylindrical clutch surface of the clutch driving member.

A thrust plate 39 is fixed within the axial bore 32 of the driven member 31, intermediate the ends thereof, by means of a suitable retaining ring. The forward portion of the bore 32 is hexagonal in cross section, for the purpose of receiving the shank of a clutch output spindle in driving relation.

The coupling between the clutch driving and driven members is provided by six rollers 41, carried in a cage 43 defined by a generally cylindrical shell. The rearward end of the cage is received within the annular space between the clutch driving and driven members; and the cage is retained in the driving member 15 by means of a plurality of balls 45 disposed in angularly spaced radial holes in the forward end of the driving member shell, these balls riding in an annular groove 47 provided on the outer surface of the cage intermediate its ends. The balls 45 are retained by a retaining ring 49 held by a suitable snap ring. This coupling arrangement permits relative rotation between the cage and the clutch driving member while preventing relative axial movement. The rearward end of the cage 43 is provided with six longitudinal openings 51 which are equally spaced around the shell to rotationally confine the rollers 41. The openings 51 are longer than the rollers 41 to permit relative axial movement as will be described. The rollers are axially confined by the clutch driven member 31, by means of shoulders defined by the annular grooves 33 and 35 and the clutch surface 37. The forward end of the cage 43 is provided with six equally spaced radial holes which are axially aligned with the roller openings 51 of the cage. Balls 53 are retained in these holes by means of retainer ring 55 and a suitable snap ring.

A clutch output spindle 61 includes a cylindrical, ball track portion 63, a rearwardly extending hexagonal shank 65, and a forwardly extending shank 67. The track portion 63 is received within the forward end of the cage 43, and includes a sinuous ball groove or track 69, defining a cam track, in which ride the balls 53 carried in the cage, the balls defining cam followers. The hexagonal shank 65 is received within the hexagonal bore 32 of the clutch driven member, whereby the output spindle 61 is rotationally coupled to the clutch driven member and relative axial movement is permitted. The forward shank 67 includes a journal portion which is rotatably supported in a bushing 71, fixed in the housing 11; and this bushing provides lower rotational support for the entire clutch assembly relative to the housing.

The sinuous ball track 69 repeats itself in sixty degree segments around the cylindrical surface portion 63 of the output spindle; and each segment includes a rearward apex and a forward apex. Therefore, the entire track is continuous and defines six rearward apexes and six forward apexes so that the six balls 53 maintain corresponding positions in respective segments of the ball track. The output spindle 61 is reciprocable axially within limits determined by the balls 53 and ball track 69; and the spindle is normally urged to a forward limiting position by means of a compression spring 73 disposed in the bore 32 of the clutch driven member, the spring bearing against the thrust plate 39 and the hex shank 65. This same spring urges the clutch driven member 31 to a rearward limiting position relative to the clutch driving member 15, defined by a torque adjusting mechanism associated with the driving member. In the forward limiting position of the output spindle 61, the balls 53 are disposed in the rearward apexes of the ball track as shown in FIG. 1. Since the output spindle 61 and the clutch driven member 31 are rotationally coupled, the positions of the cage 43 and rollers 41 relative to the clutch surface 37 of the clutch driven member are controlled by the balls 53 and the ball track 69, through the axial reciprocating movement of the spindle relative to the cage. This control function will be described in detail in connection with the description of the operation of the clutch, with particular reference to FIGS. 6 through 11.

The output spindle 61 is provided with an annular groove between the track portion 63 and the forward shank 67. An O-ring 75 is disposed in this groove for engagement with frusto-conical or bevel shoulder 77, defined by the interior wall of the housing 11, when the spindle is in its forward limiting position. This acts to prevent rotaton of the output spindle which might occur through frictional drag when the driving clutch member is rotating, even though the clutch is disengaged.

The output spindle functions as a bit holder; and, for this purpose, is provided with a hexagonal bore 79 at its forward end to receive the hexagonal shank of a bit, such as a square drive 81 for a socket, shown in FIG. 1. The forward end of the forward shank 67 is provided with a radial hole, communicating with the hexagonal bore 79 in which is seated a ball 83. The radial hole is formed to permit the ball 83 to extend into the bore but to prevent the ball from passing into the bore; and a spring clip 85 urges the ball inward and permits outward movement thereof. The hexagonal shank of the square drive 81, or other bit, is provided with an annular groove 87 which receives the ball 83 for the purpose of locking the square drive in drive position. A snap ring 89 defines a conventional safety lock for the square drive 81.

Means is provided for adjusting the clutch so that it will disengage, or kick out, in response to a predetermined torque. As best shown in FIGS. 1 and 2, a small axial bore 91 is provided in the clutch driving member 15, extending rearwardly from the tapered bore 17. An adjusting pin 93 is disposed in the bore for axial movement; and this pin is provided with a conical forward end surface which rests against four balls 95 disposed in a transverse plane in the axial bore 32 of the clutch driven member, these balls in turn resting against the thrust plate 39. The adjusting pin 93 is provided with an inclined surface 97 formed by a cut in the pin. The driving member is provided with a radial, threaded bore 99 opening into the bore 91. A threaded adjustment screw 101, disposed in the threaded bore 99, is provided with an inwardly extending projection which engages the inclined surface 77 of the adjusting pin; whereby radially inward movement of the adjustment screw effects forward movement of the adjusting pin, and radially outward movement of the adjustment screw results in rearward movement of the adjusting pin. The adjustment screw is provided with an outwardly facing hex socket for external adjustment by means of an Allen wrench, for example.

Forward movement of the adjusting pin 93 effects forward movement of the clutch driven member 31, relative to the clutch driving member 15 and to the cage 43, through the balls 95 and the thrust plate 39. Since the rollers 41 are axially confined by the clutch driven member, the rollers are also moved forward relative to the clutch driving member; and this positions the roller axially adjacent a relatively thinner section of the driving member shell. Since the disengagement or kickout point of the clutch is determined by resistance to deformation of the driving member shell, the clutch will disengage in response to a lower torque when the rollers are positioned adjacent to a thinner section of the driving member shell. When the adjustment screw is moved outwardly, the adjusting pin and clutch driven member may move rearwardly relative to the driven member, and this is effected by the spring 73 which continuously urges the driven member rearwardly. The rearward limiting position of the clutch driven member is determined by the engagement of the inclined surface 97 with the adjustment screw 101. The rollers 41 are carried rearwardly with the clutch driven member to positions adjacent a thicker section of the driving member shell, hence, a higher torque is required to effect disengagement of the clutch.

In order to permit the adjustment of the adjustment screw 101, the housing 11 is provided with six angularly spaced holes 103 lying in the plane of the threaded bore 99 of the clutch driving member. A cover clip 105 encloses the housing in the area of the holes 103, and is provided with six corresponding holes 106 which may be aligned with the holes in the housing to provide the above mentioned access. The cover clip is normally rotated to a locking position wherein the holes 103 are covered by the cover clip to protect the interior of the housing from foreign material.

As best seen in FIG. 2, the clutch driving member is provided with an additional threaded bore 107, transverse to and opening into the threaded bore 99, and opening from the exterior wall of the driving member. A set screw 109 is threaded into the bore 107 for locking the adjustment screw 101 in the desired position, through an intermediate protection nylon plug, for example. Access to the set screw is also provided through the above mentioned holes 103 and 106.

From the foregoing description of the torque adjustment, it is seen that relative axial movement between the clutch driving and driven members does occur during such adjustment. It should be noted, however, that such relative axial movement does not occur during operation of the clutch.

A cycle of operation for the above described clutch will now be set forth with particular reference to FIGS. 6 through 11. This clutch is particularly adapted for use with power tools, such as a nutsetter, in mass production industries. In such use, where an operator is rapidly setting a series of nuts, it is likely that the tool motor will be running continuously as the operator moves the tool from nut to nut. It is assumed that rotation of the parts in clockwise direction as viewed from the rearward end of the assembly, indicated by arrows in FIGS. 6 through 11.

When the tool is removed from a work piece, the clutch assembly is in the condition shown in FIG. 1, wherein the output spindle 61 is urged to its forward limiting position by the spring 73. In this condition, the balls 53 lie in the rearward apexes 111 of the ball track 69 and are held against further rotation relative to the spindle, as best shown in FIG. 6; and the rollers 41 are maintained in positions intermediate adjacent ridges on the driven member clutch surface 37, as best shown in FIG. 7. The rollers cannot move to a wedged condition between the driving and driven clutch surfaces, and the clutch cannot engage even though the clutch driving member is being rotated by the driving motor. In this condition, the remainder of the clutch assembly may tend to rotate due to frictional drag between the rollers and the clutch surfaces and also between the rotational coupling between the clutch driving member and the cage. To facilitate the engagement of the tool with the nut, this rotation is prevented through engagement of the O-ring 75 with the housing shoulder 77.

The apexes 111 of the ball track are slightly flattened, as best shown in FIG. 6, so that the balls 53 may rotate slightly while remaining confined within these apexes. This is to permit the balls to move to a clockwise and over-center position relative to the apexes 115 formed by the lower wall of the ball track. The balls assume this over-center position, shown in FIG. 6, through the natural movements of the balls in the track.

When the tool is engaged with a nut, axial pressure on the tool by the operator urges the square drive 81 and output spindle 61 rearward relative to the cage 43 and the balls 53. Due to the configuration of the ball track track 69, particularly the above described over-center position of the balls relative to the apexes 115, when the output spindle is moved rearwardly the inclined wall portions 117 of the ball track will urge the balls 53 in a clockwise direction (to the left as viewed in FIGS. 6 and 8), relative to the output spindle. This results in corresponding clockwise movement of the rollers 41 relative to the clutch surface 37; and the rollers are rotated to the wedged condition between the clutch surfaces, as best shown in FIG. 9. The balls 53 have then moved to the positions shown in FIG. 8 relative to the ball track; and the clutch is now engaged to drive the output spindle 61. The rearward movement of the output spindle has disengaged the O ring 75 from the shoulder 77. The rearward thrust of the clutch assembly relative to the housing is smoothly absorbed through the thrust bearing 21.

When the predetermined resistance to turning of the output spindle is encountered, the clutch driving member shell will distort to permit the rollers 41 to pass over the ridges of the clutch surface 37 in a clockwise direction toward the position shown in FIG. 11, which is a non-driving condition. This movement of the rollers relative to the clutch driven member is accompanied by corresponding movement of the balls 53, and these balls move from the position shown in FIG. 8 to the position shown in FIG. 10. The balls now rest in the forward apexes 119 of the ball track 69; and, since the balls cannot rotate further relative to the output spindle, the rollers are held in the FIG. 11 position relative to the clutch surface 37. The clutch has now kicked out or disengaged. The apexes 119 are flattened in the same manner as the apexes 115 in order that the balls 53 may move to a slightly clockwise and over-center position relative to the apexes 121 defined by the rearward wall of the ball track 69. The balls move to this over-center position through the kickout action and the continuing force applied by the operator.

When the operator removes the tool from the work, the spring 73 again urges the spindle 61 to the forward limiting position; and, through this spring action, the inclined wall portions 123 of the ball track urge the balls 53 clockwise to the positions shown in FIG. 6; the rollers again being moved to the positions shown in FIG. 7. By this means the clutch is reset for a succeeding cycle.

An important feature of this invention is that the positions of the rollers 41 relative to the clutch surface 37 are positively controlled at all times throughout a clutch cycle, in that the rollers are either positively rotated relative to the clutch surface or are restrained from rotation relative to the clutch surface. Therefore, complete and positive control of the clutch cycle is provided, and this control is provided automatically through the axial force applied by the operator during normal operation of the tool. Due to the structural design which provides this positive control, no reliance is placed on frictional drag to effect the proper functioning of the clutch.

Another feature of this invention is the provision of a self-contained clutch assembly which may be readily removed from its housing, as an assembly, for the purpose of repair or replacement.

A further feature of this invention is the provision of means for preventing rotation of the output spindle of the clutch assembly, due to frictional drag, to facilitate the engagement of the tool with the work.

What is claimed is:

1. A torque responsive clutch comprising:
    a first rotatable clutch member defining a cylindrical shell having an internal clutch surface; a second rotatable clutch member, having an external clutch surface, disposed coaxially within said first clutch member;
    means for connecting one of said clutch members to a power actuator whereby said one member is rotated about its own axis and constitutes the driving member of said clutch, while the other member constitutes the driven member; a plurality of longitudinal ridges formed on and angularly spaced around the clutch surface of said driven member;
    a cage disposed between said clutch surfaces; a plurality of rollers rotationally confined in said cage for engagement with said clutch surfaces; said rollers effecting a driving connection between said driving and driven members when rotated to a wedged condition between said ridges and the clutch surface of said driving member, and said driving connection being interrupted when said rollers pass over said ridges through deformation of said clutch members;
    an output spindle nonrotatably coupled to said driven member and being axially movable relative thereto; continuously engaged cam and follower means carried respectively on said cage and said spindle; and said cam and follower means acting, in response to reciprocating axial movements of said spindle relative to said cage, to positively control the rotational positions of said rollers relative to said ridges during a complete clutch cycle.

2. A torque responsive clutch comprising:

a first rotatable clutch member defining a cylindrical shell having an internal clutch surface; a second rotatable clutch member, having an external clutch surface, disposed coaxially within said first clutch member;

means for connecting one of said clutch members to a power actuator whereby said one member is rotated about its own axis and constitutes the driving member of said clutch, while the other member constitutes the driven member; a plurality of longitudinal ridges formed on and angularly spaced around the clutch surface of said driven member;

a cage disposed between said clutch surfaces; a plurality of rollers rotationally confined in said cage for engagement with said clutch surfaces; said rollers effecting a driving connection between said driving and driven members when rotated to a wedged condition between said ridges and the clutch surface of said driving member, and said driving connection being interrupted when said rollers pass over said ridges through deformation of said clutch members;

an output spindle nonrotatably coupled to said driven member and being axially movable relative thereto; coacting cam means and follower means defined by a continuous cam track and a plurality of projecting followers respectively, carried on said cage and said spindle; and said cam and follower means being in continuous engagement and acting, in response to reciprocating axial movements of said spindle relative to said cage, to positively control the rotational positions of said rollers relative to said ridges during a complete clutch cycle.

3. The invention set forth in claim 2 wherein said cage is rotatably coupled to said driving member.

4. The invention set forth in claim 2 wherein said first clutch member is said driving member, and wherein said second clutch member is said driven member.

5. A torque responsive clutch comprising:

a first rotatable clutch member defining a cylindrical shell having an internal clutch surface; a second rotatable clutch member, having an external clutch surface, disposed coaxially within said first clutch member;

means for connecting one of said clutch members to a power actuator whereby said one member is rotated about its own axis and constitutes the driving member of said clutch, while the other member constitutes the driven member; a plurality of longitudinal ridges formed on and angularly spaced around the clutch surface of said driven member;

a cage disposed between said clutch surfaces; a plurality of rollers rotationally confined in said cage for engagement with said clutch surfaces; said rollers effecting a driving connection between said driving and driven members when rotated to a wedged condition between said ridges and the clutch surface of said driving member, and said driving connection being interrupted when said rollers pass over said ridges through deformation of said clutch members;

an output spindle nonrotatably coupled to said driven member and being axially movable relative thereto, said output spindle providing a cylindrical surface having a continuous cam track;

said cage comprising a cylindrical shell, disposed coaxially with said spindle, having angularly spaced cam follower members projecting into said cam track; said cage shell having angularly spaced longitudinal openings for rotationally confining said rollers;

said cam track comprising repetitive segments corresponding in number to the ridges on said driven member clutch surface, wherein the positions of said rollers relative to said ridges are in positive relation to the positions of said cam follower members relative to said cam track; and said cam track and follower members being in continuous engagement and acting, in response to reciprocating axial movements of said spindle relative to said cage, to positively control the rotational positions of said rollers relative to said ridges during a complete clutch cycle.

6. A torque responsive clutch comprising:

a first rotatable clutch member defining a cylindrical shell having an internal clutch surface; a second rotatable clutch member, having an external clutch surface, disposed coaxially within said first clutch member;

means for connecting one of said clutch members to a power actuator whereby said one member is rotated about its own axis and constitutes the driving member of said clutch, while the other member constitutes the driven member; a plurality of longitudinal ridges formed on and angularly spaced around the clutch surface of said driven member;

a cage disposed between said clutch surfaces; a plurality of rollers rotationally confined in said cage for engagement with said clutch surfaces; said rollers effecting a driving connection between said driving and driven members when rotated to a wedged condition between said ridges and the clutch surface of said driving member, and said driving connection being interrupted when said rollers pass over said ridges through deformation of said clutch members;

coupling means between said driving member and said cage, said coupling means permitting relative rotation and preventing relative axial movement;

an output spindle nonrotatably coupled to said driven member and being axially movable relative thereto; coacting cam means and follower means carried respectively on said cage and said spindle, said cam and follower means limiting the axial movements of said spindle relative to said cage; spring means disposed between said driven member and said output spindle urging said driven member to an axially limiting position, defined by said driving member, and urging said output spindle to an axially limiting position, defined by said cam and follower means; said cam and follower means being in continuous engagement and acting, in response to reciprocating axial movements of said spindle relative to said cage, to positively control the rotational positions of said rollers relative to said ridges during a complete clutch cycle;

and said structure defining a unitized, self-contained clutch assembly.

7. The invention set forth in claim 6 including: a housing for said clutch; said housing having means defining an axially limiting position for said driving member; said housing having an interal brake surface; said output spindle having a complementary external brake surface; and said brake surfaces being engaged to prevent rotation of said output spindle, when said spindle is in a forward axially limiting position defined by said cam and follower means.

8. The invention set forth in claim 7 wherein said housing brake surface is defined by a bevel surface; and wherein said spindle brake surface is defined by an O-ring nonrotatably fixed to said spindle.

9. A torque responsive clutch comprising:

a first rotatable clutch member defining a cylindrical shell having an internal clutch surface; a second rotatable clutch member, having an external clutch surface, disposed coaxially within said first clutch member, means for connecting one of said clutch members to a power actuator whereby said one member is rotated about its own axis and constitutes the driving member of said clutch, while the other member constitutes the driven member; a plurality of longitudinal ridges formed on and angularly spaced around the clutch surface of said driven member;

a cage disposed between said clutch surfaces; said driving member, said driven member and said cage being axially immovable relative to each other; a plurality of rollers rotationally confined in said cage for engagement with said clutch surfaces; said rollers effecting a driving connection between said driving and driven members when rotated to a wedged condition between said ridges and the clutch surface of said driving member, and said driving connection being interrupted when said rollers pass over said ridges through deformation of said clutch members;

an output spindle nonrotatably coupled to said driven member and being axially movable relative thereto; a continuous cam track disposed on said spindle, said cam track comprising repetitive segments corresponding in number to the number of said ridges; follower means carried by said cage for continuous engagement with said cam track, whereby said cage and said output spindle are axially and rotationally coupled through said cam track and follower means; said spindle being axially movable between extended and retracted positions relative to said cage, limited by said cam track and follower means;

spring means normally urging said spindle to a limiting extended position to rotate said rollers to positions intermediate said ridges and to maintain said rollers in such positions; movement of said spindle toward said retracted position, in response to an axial force on said spindle, effecting rotation of said rollers to wedged positions between said ridges and the clutch surface of said driving member; said movement of said rollers when passing over said ridges being accompanied by corresponding movement of said follower means, said movement and the axial force on said spindle effecting movement of said spindle to a limiting retracted position to maintain said rollers in such positions until the axial force on said spindle is removed; and said cam track and follower means acting, in response to the axial movements of said spindle relative to said cage, to positively control the rotational positions of said rollers relative to said ridges during a complete clutch cycle.

10. A torque responsive clutch comprising:
a first rotatable clutch member defining a cylindrical shell having an internal clutch surface; a second rotatable clutch member, having an external clutch surface, disposed coaxially within said first clutch member;

means for connecting one of said clutch members to a power actuator whereby said one member is rotated about its own axis and constitutes the driving member of said clutch, while the other member constitutes the driven member; a plurality of longitudinal ridges formed on and anguarly spaced around the clutch surface of said driven member;

a cage disposed between said clutch surfaces; said driving member, said driven member and said cage being axially immovable relative to each other; a plurality of rollers rotationally confined in said cage for engagement with said clutch surfaces; said rollers effecting a driving connection between said driving and driven members when rotated to a wedged condition between said ridges and the clutch surface of said driving member, and said driving connection being interrupted when said rollers pass over said ridges through deformation of said clutch members;

an output spindle nonrotatably coupled to said driven member and being axially movable relative thereto, said output spindle being provided with a continuous sinuous cam track; said cam track comprising repetitive segments corresponding in number to the number of said ridges, each segment including a forward and rearward apex; said cage having cam follower members disposed in continuous engagement with said cam track;

means urging said spindle axially to a forward limiting position wherein said follower members are positioned in said rearward apexes and said rollers are positioned intermediate said ridges; said spindle being movable toward a limiting rearward position to urge said follower members toward said forward apexes and to urge said rollers into the wedged condition between said ridges and the clutch surface of said driving member; said follower members moving to said forward apexes when said rollers pass over said ridges; said movement of said spindle toward said forward limiting position urging said rollers to said intermediate positions; and said cam track and follower members acting, in response to said axial movements of said spindle between said forward and rearward limiting positions, to positively control the rotational positions of said rollers relative to said ridges during a complete clutch cycle.

11. A torque responsive clutch comprising:
a rotatable clutch driving member defining a deformable cylindrical shell having an internal clutch surface; a rotatable clutch driven member, having an external clutch surface, disposed coaxially within said driving member; a plurality of longitudinal ridges formed on and angularly spaced around said clutch surface of said driven member;

a cage defined by a cylindrical shell rotatably mounted on said driving member and extending between said clutch surfaces; a plurality of rollers rotationally confined in said cage for engagement with said clutch surface; said rollers effecting a driving connection between said driving and driven members when rotated to a wedged condition between said ridges and said driving member clutch surface, and said driving connection being interrupted when said rollers pass over said ridges through deformation of said driving member;

an output spindle nonrotatably coupled to said driven member and being axially movable relative thereto; said spindle having an external cylindrical portion provided with a continuous sinuous cam track, said cylindrical portion being coaxially disposed within said cage;

said cage having inwardly projecting cam follower members in continuous engagement with said cam track, whereby said cage and said spindle are rotationally and axially coupled relative to each other; and said rollers being positively positioned relative to said ridges through axial reciprocating movement of said spindle relative to said cage.

References Cited by the Examiner

UNITED STATES PATENTS

| 2,394,348 | 2/46 | Wilhide | 81—52.4 |
|---|---|---|---|
| 2,632,485 | 3/53 | Peck | 192—56 |
| 2,973,848 | 3/61 | Dixon | 192—47 |
| 2,978,082 | 8/61 | Better | 192—56 |
| 2,989,996 | 6/61 | Dixon | 192—56 |
| 3,005,325 | 10/61 | Eckman | 192—56 |

DAVID J. WILLIAMOWSKY, *Primary Examiner.*